US011292086B2

(12) United States Patent
Marti et al.

(10) Patent No.: US 11,292,086 B2
(45) Date of Patent: Apr. 5, 2022

(54) THERMO-CONCEPT FOR A MACHINE TOOL

(71) Applicant: Agathon AG, Maschinenfabrik, Bellach (CH)

(72) Inventors: Jürg Marti, Solothurn (CH); Thomas Reber, Biberist (CH)

(73) Assignee: AGATHON AG, MASCHINENFABRIK, Bellach (CH)

( * ) Notice: Subject to any disclaimer, the term of this patent is extended or adjusted under 35 U.S.C. 154(b) by 191 days.

(21) Appl. No.: 15/945,283

(22) Filed: Apr. 4, 2018

(65) Prior Publication Data
US 2018/0318963 A1 Nov. 8, 2018

(30) Foreign Application Priority Data

May 3, 2017 (EP) ..................................... 17169292

(51) Int. Cl.
B23K 26/362 (2014.01)
B23K 26/14 (2014.01)
(Continued)

(52) U.S. Cl.
CPC ........ *B23K 26/362* (2013.01); *B23K 26/0006* (2013.01); *B23K 26/03* (2013.01);
(Continued)

(58) Field of Classification Search
CPC ...... B23K 26/00; B23K 26/006; B23K 26/03; B23K 26/08; B23K 26/125; B23K 26/127;
(Continued)

(56) References Cited

U.S. PATENT DOCUMENTS 5,643,472 A * 7/1997 Engelsberg ........ B23K 26/1436
216/65
5,709,754 A * 1/1998 Morinville ............ B08B 7/0042
134/1

(Continued)

FOREIGN PATENT DOCUMENTS

CN 101362254 A 2/2009
CN 102728950 A 10/2012
DE 102009017441 A1 * 10/2010 ............. B23K 26/38

OTHER PUBLICATIONS

CN 102151987 Translated by Google Patents (Year: 2011).*

(Continued)

*Primary Examiner* — Ibrahime A Abraham
*Assistant Examiner* — Elizabeth M Sims
(74) *Attorney, Agent, or Firm* — Pearne & Gordon LLP

(57) ABSTRACT

The present invention relates to a laser machining system (1) with a control unit (30), a laser ablation apparatus (10) and a gas supply (40), wherein the laser ablation apparatus (10) comprises a laser (12) for generating a laser beam (14), a laser head (16) including a re-directing arrangement (18) for directing the laser beam (14) of the laser (12) onto a surface (20) of a workpiece (22) to be machined, wherein the workpiece (22) is disposed in an accommodation device (26), placed in a working chamber (28), wherein a positioning arrangement (32) is provided for a relative movement between the laser head (16) and the workpiece (22) and wherein the working chamber (28) comprises at least one inlet (46) and at least one outlet (48) for a gas. The gas supply (40) of the laser machining system (1) is configured to provide a flow of the gas in the working chamber (28) and a temperature system (11) is provided to adjust the temperature of the gas flow (44).

18 Claims, 3 Drawing Sheets

(51) Int. Cl.

| | |
|---|---|
| *B23K 26/03* | (2006.01) |
| *B23K 26/12* | (2014.01) |
| *B23K 37/00* | (2006.01) |
| *B23K 26/08* | (2014.01) |
| *B23K 26/40* | (2014.01) |
| *B23K 26/00* | (2014.01) |
| *B23K 26/361* | (2014.01) |

(52) U.S. Cl.
CPC ............ *B23K 26/08* (2013.01); *B23K 26/125* (2013.01); *B23K 26/127* (2013.01); *B23K 26/14* (2013.01); *B23K 26/361* (2015.10); *B23K 26/40* (2013.01); *B23K 37/003* (2013.01)

(58) Field of Classification Search
CPC .... B23K 26/362; B23K 26/361; B23K 26/40; B23K 26/12; B23K 37/003; B23K 35/0233; B23K 1/20; B23K 26/034; B23K 26/032; B23K 26/082; B23K 26/0626; B23K 26/0643; B23K 26/703; B23K 26/354; B23K 26/1224; B23K 26/123; B23K 26/10; B23K 26/355; B23K 26/144; B23K 26/1464; B23K 26/128; B23K 26/14; B23K 26/352; B23K 26/126; B23K 26/146; B23K 26/1476; B23K 26/16; B23K 26/1437; B23K 26/1462; B23K 26/147; B23K 26/36; B23K 26/0648; B23K 15/02; B23K 15/0013; B23K 15/06; B23K 15/0026; B23K 31/10; B23K 11/252; B23K 9/0953; B23K 9/1062; B23K 9/322; B23K 9/0956; B26K 26/38; H05K 3/305; H01S 5/068; H01S 5/02453; H01S 5/0612; H01S 5/0261; H01S 3/08; H01S 3/081; H01S 3/076; H01S 3/0813; H01S 3/10061; H01S 3/08068; H01S 3/08054; H01S 3/2232; H01S 3/10; H01S 3/13; H01S 3/036; H01S 3/031; B22F 2203/11; C21D 1/09; C21D 1/34; C03B 33/082; C03B 33/102; G01K 11/00; G01K 11/125; G01K 13/00; G01K 13/10; G01K 2213/00; G01J 2005/0048; G01J 2005/0081; G01J 2005/0085; G01J 2005/063; G01J 2005/204; G01J 2005/0003; G01J 2005/004; G01J 5/061; G01J 5/0853; G01J 5/20; G01J 5/0007; G01J 5/0037; G05B 2219/45165; G02B 2006/12121; G02B 1/12; H01L 21/268; H01L 21/67115; H01L 21/67248; H01L 21/6719; H01L 21/6836; H01L 2224/81224; H01L 2224/83224; H01L 2224/859
USPC ...................................... 219/121.68
See application file for complete search history.

(56) References Cited

U.S. PATENT DOCUMENTS

| | | | | |
|---|---|---|---|---|
| 5,748,656 | A * | 5/1998 | Watson | H01S 3/036 372/35 |
| 6,509,070 | B1 * | 1/2003 | Voevodin | C30B 29/16 427/572 |
| 6,588,437 | B1 * | 7/2003 | Higashi | H01L 21/02046 134/148 |
| 7,514,015 | B2 * | 4/2009 | Elliott | B08B 7/0042 156/345.5 |
| 8,591,755 | B2 * | 11/2013 | Dhindsa | H01J 37/32935 216/59 |
| 2005/0098264 | A1 | 5/2005 | Wolf et al. | |
| 2006/0108221 | A1 * | 5/2006 | Goodwin | G01N 33/0009 204/424 |
| 2009/0258470 | A1 * | 10/2009 | Choi | C23C 16/45531 438/386 |
| 2018/0186082 | A1 * | 7/2018 | Randhawa | B29C 64/135 |

OTHER PUBLICATIONS

OSHA Compressed Air Incident Report for 2019 https://www.osha.gov/pls/imis/AccidentSearch.search?acc_keyword=%22Compressed%20Air%22&keyword_list=on (Year: 2019).*

Extended European Search Report issued in corresponding European Patent Application No. 17169292.4 dated Dec. 1, 2017, 6 pages.

* cited by examiner

THERMO-CONCEPT FOR A MACHINE TOOL

TECHNICAL FIELD OF THE INVENTION

This invention relates to a laser machining system comprising a control unit, a laser ablation apparatus and a gas supply, wherein a temperature system is provided to control the temperature of the gas in a working chamber of the apparatus.

BACKGROUND OF THE INVENTION

Laser machining systems for machining a substrate or workpiece with a laser beam are known. Furthermore, laser machining apparatus and methods are known for forming a surface on a substrate or workpiece, in particular one or more cutting edges to form a cutting tool. For machining, a cutting tool laser ablation with the aid of shortly pulsed lasers offers possibilities to economically machine very hard materials, for example, polycrystalline diamond or CVD diamond.

A laser machining apparatus may be generally described as comprising a laser source, generating a light beam, which is directed by means of mirrors towards the zone of ablation. Before it reaches the plane of ablation, there is interposed on its path a focusing lens whose role is to concentrate the light beam into a spot of very small diameter, which furnishes a very high density of energy. The ablation is obtained by sublimation of the material at the spot where the beam is focused. The essential requirements for the process of ablation to occur is that enough energy is absorbed in the material in a sufficiently short time that the temperature is raised rapidly to a point such that the material decomposes. All ablation processes lead to the generation of a range of ablation product components which can be gaseous, liquid or solid, the so called ablation debris. These ablation debris are a significant problem.

Methods and devices have been used to attempt to capture and control ablation debris generated during laser ablation processes. Most of them rely on some type of gas flow near the surface that is being ablated. But the application of gas flow can also lead to undesired perturbation of the processing environment. Gaseous currents or turbulences may be caused which have a negative impact on the processing. The flow can be created by blowing on one side of the area and sucking strongly from the other side of the area wherein it is important to avoid deposition of entrapped ablation debris by the fluid flow on other parts of the substrate or on other elements of the laser ablation apparatus.

Known laser machining systems provide a working area in an interior space or enclosure, the so-called working chamber, wherein the interior space can be defined by a housing and may include an openable shielding device that attenuates transmission of light and other elements between the interior space and an exterior space. This kind of enclosure of the workpiece has to be adapted to keep the volume surrounding the processing fully compliant with the processing needs. The enclosure has to be sealed comprising at least one substantially airtight and light tight sealing of the inner volume of the enclosure from the outside and/or a tight sealing for the gas inside the enclosure. With this enclosure, the user of the laser machining apparatus is protected from the transmission of the light and ablation debris. Opening the shielding device leads to exchange of gas and heat between the working chamber and the environment, wherein the change of temperature of the apparatus elements arranged in the working chamber can cause deformations and precision problems. Furthermore, in the interior space a gas flow can be directed onto the ablation spot, wherein the gas flow is directed expediently at an inclined angle onto the machining area. The plasma formed during sublimation is removed from the machining area of the laser via the gas flow. The gas supply can comprise several gas nozzles of which each directs a partial stream from different directions onto the machining area in the vicinity of the impact spot of the laser beam.

In order to limit the drawbacks known, a laser ablation apparatus can be generally employed with a suction hood also referred as ejector with one or more doors arranged to provide excess to the working area and with suction units provided to create a slight depression. A suction hood is provided to design a working chamber which is oil tight, water tight, air tight and/or light tight. The tightness of the working chamber leads however to a badly controlled air stream. Air may enter into the working chamber through labyrinths of the doors creating a turbulent flow which exits through provided exhaust pipes. The turbulent flow of the air can cause zones in the working chamber in which the gas, fumes and/or mist is unaffected by the suction and remain in the working chamber.

Furthermore, not only the removal of ablation debris has to be solved but also the temperature distribution is important to improve the accuracy of machined components. In a laser ablation apparatus different sources of heat lead to a heterogeneous temperature distribution across the apparatus in respect to localization and time. This heterogenous temperature distribution causes thermal deformation errors and leads to negative effects on the machine precision. Long lasting machining processes generate even more heat by localized heating processes. The amount of heat input to the workpiece causes extraneous heating of the bulk material, which may cause part distortion and adverse heat affected zones.

An arrangement of the entire laser machining system into a room with controlled temperature is known for providing a homogenous temperature for the laser machining. Furthermore, it is known to provide cooling of different elements of the laser machining system as well as providing small machine elements with small motors to decrease the heat emitted by them.

It is an object of the invention to provide a laser machining system by which deformation errors caused by thermal effects are minimized in an economical manner.

SUMMARY OF THE INVENTION

The invention concerns a laser machining system comprising a control unit, a laser ablation apparatus and a gas supply, wherein the gas supply comprises supply and extraction. The laser machining system comprises a laser ablation apparatus enabling a laser to ablate a region on a surface of a substrate or workpiece comprising an at least partially closed working chamber provided with the gas supply and a temperature system.

The working chamber is configured as an enclosure having an inlet and outlet by means of which a flow of a gas, especially air from the surrounding, is provided in an inner volume of the enclosure in such a way that it is caused to flow over the surface of the substrate to be processed, the working area, so as to entrap debris ablated from the substrate and to cool the critical area. The fluid used is preferably air but can be in some cases other gases such as nitrogen, helium, neon, argon, krypton, xenon and/or radon.

The flow of the gas is used to entrap the ablation debris and direct it away from the critical area or preferably remove it completely from the working area.

Furthermore, it is advantageous that even by opening the working chamber no disturbance of the air flow occurs and the amount of additional exchange of air is largely reduced.

The flow of the gas can be created by causing gas to enter the working chamber by means of a pump and at least one nozzle, wherein the gas may be pressed through at least one well-defined air inlet into the working chamber or by extracting exhaust gas out of the working chamber through a gas outlet or both is realized. According to a preferred version of the invention, the flow of the gas is created by a gas supply in a manner that the gas flow is provided to flow substantially in a laminar flow over the region of ablation and in the whole working chamber. The gas supply comprises a gas supply structure and a gas removal structure. In the case of laminar flow of the gas the efficiency of the ablation debris removal can be increased without any re-deposition.

Preferably a control unit to control the flow of the gas is configured to control physical and/or chemical properties of the gas flowing through the inlet and/or through the outlet of the enclosed working chamber, e.g. the control unit is configured to control the gas supply and/or the temperature system.

It is known that the forced-convection cooling by means of air jets employed in prior art and effective in removing heat and ablation debris from the different parts of the laser machining system, for example the optical elements, impinge on the optical elements and the forces due to the impingement effects the position and control of mirrors and lenses comprised in typically laser machining systems. Therefore, the accuracy of position and velocity of laser machining systems are reduced by the use of forced-convection cooling. Additionally the use of turbulent flow of heated air across the optical beam causes optical aberrations which tend to increase the minimum achievable size of the focused spot, further impairing the precision of the system.

The capability of the gas to pass entrapped debris particles away from the origin site along a predetermined path depends on the momentum transferred and on the size and the weight of the entrapped particles. The most favorable situation in order to optimize the efficiency of the momentum transfer into the gas flow is the development of a laminar boundary layer attached to the workpiece area to be machined. For the aerodynamic behavior of the gas flow the selection of the distance between the impingement point of gas jet and the laser beam, the gas pressure, the nozzle type and nozzle diameter are factors.

In laser machining systems it is known that very large amounts of waste heat of the laser and of the laser beam itself accumulate in the laser and in the optical elements used to bend, focus and direct the output laser beam. There is a need for an economic and efficient cooling system for laser machining systems. The apparatus according to the invention comprises a temperature system providing for the directed flow of gas to be adjusted in temperature. Typically the temperature system comprises a device for heating or cooling used to adjust and control the temperature of the incoming gas flow. The device can be configured as a heat exchanger wherein air and/or water is used. For example water can be used in a first cooling circuit and can be further used for cooling electrical devices, optical and mechanical components, comprised in the laser ablation system. The thermal stability of working area is greatly increased by the control of the temperature of the incoming gas flow and no disturbing air stream can destabilize the air management in the working chamber.

Furthermore, the temperature system comprises sensor means, in particular temperature sensors arranged to determine the temperature of the workpiece, of the gas in the working chamber, e.g. at different areas and of other elements. According to a preferred version of the invention an IR sensor is arranged to determine the temperature of the workpiece. Other sensor means 100 (FIG. 2) are arranged to measure the temperature of the fluid in the working chamber. The measured thermal values can be utilized to control the temperature of the incoming gas flow by the control unit. The control unit may control the heat exchanger such as to adjust the temperature of the incoming gas flow to a predetermined value by operating valves adjusting the temperature of a primary side of the heat exchanger which has an effect on the temperature on a secondary side of the heat exchanger. According to this one of the advantages is that the incoming gas flow of controlled temperature can be used to adapt the temperature of the elements comprised in the system of laser ablation like the workpiece and any mechanical, electrical or optical precision parts. Sensitive mechanical, electrical and optical parts are protected from the ablation debris by the flow of gas.

Furthermore, the incoming gas flow is passed through filter means before entering the working chamber. Therefore, the heat exchanger may comprise a gas inlet for sucking in gas, for example air from the environment, and is provided with filter means arranged at the gas inlet to prevent particles from the environment to enter the working chamber.

The gas flow will carry particles of the ablation debris of any size. A tray can be arranged such that ablation debris partially are collected. The tray can be arranged such that it can be easily removed and cleaned. The other particles entrapped in the gas flow can be absorbed on filter means arranged at the inlet and/or the outlet of the gas supply. In a preferred embodiment, filter means are provided at the gas removal structure adapted to absorb ablation debris. For example a pre-filter can be arranged at the gas outlet in order to absorb bigger particles. Additional filters arranged in the suction unit absorb smaller particles, wherein the suction unit can comprise a fan unit and various filters. For example one of the filters can be provided to absorb hazardous particles such as cobalt, nickel, chrome, manganese and iron.

The working chamber can be limited by walls configured as a double wall, e.g. of sheet metal. The gap between the double wall can be filled with an insulation material, e.g. with air. Therefore, the interior of the working chamber is thermally insulated from the exterior.

The arrangement of pipes leading to the input and/or output may be in such a way to spare space like to be grouped together. Furthermore, the arrangement may be such to avoid transferring heat. For example the gas supply comprising a suction unit may be arranged beneath the laser ablation apparatus in order to simplify piping and to avoid heating of the apparatus for example by the exhausted gas flow, wherein the gas inlet can be arranged on top of the working chamber.

BRIEF DESCRIPTION OF THE DRAWINGS

Exemplary embodiments of the present invention will now be dew scribed with reference to the accompanying drawings, in which.

DETAILED DESCRIPTION OF THE ILLUSTRATED EMBODIMENTS

Figure 1:
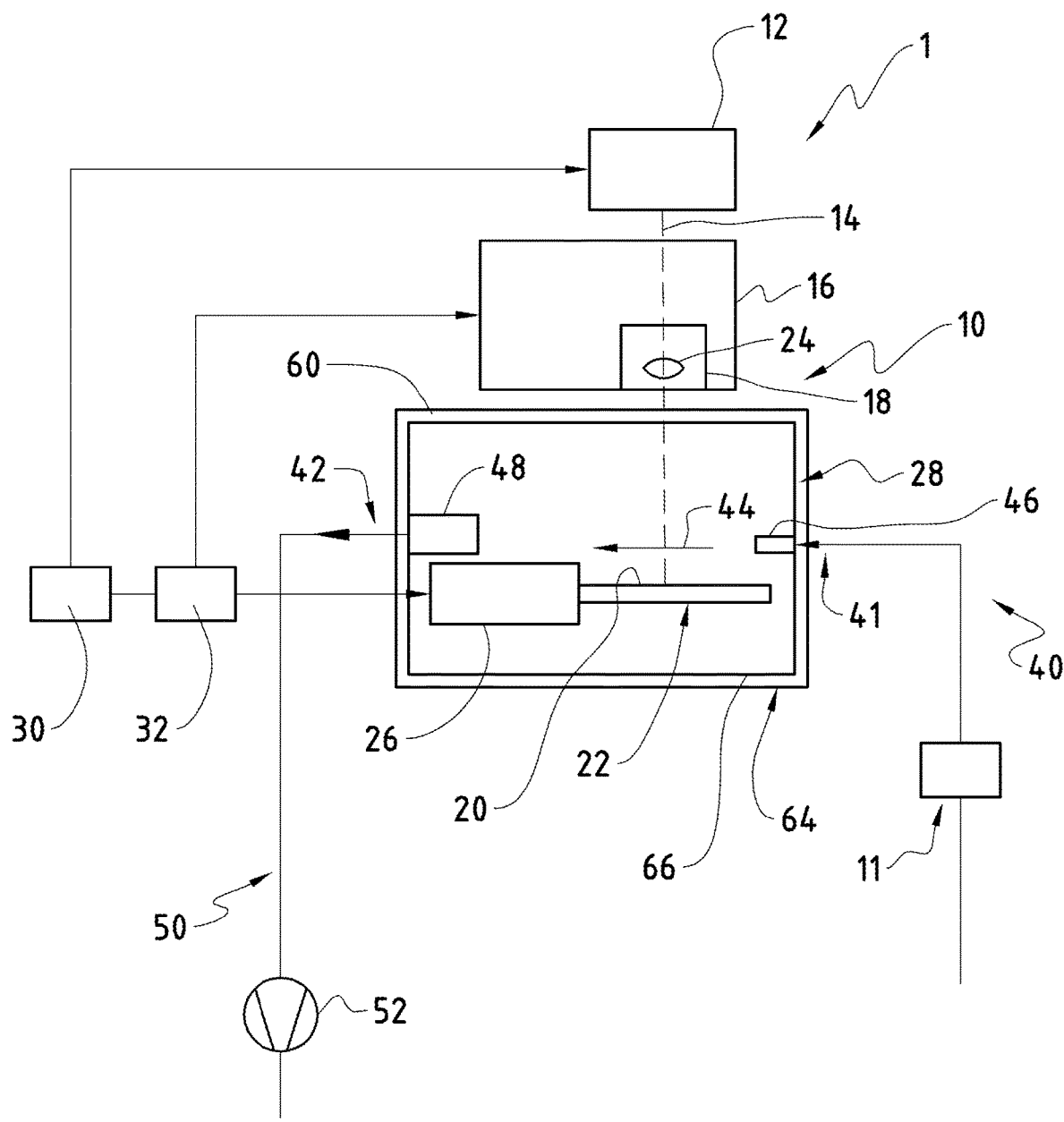
FIG. 1 is a schematic view of a laser machining system in accordance with one embodiment of the invention.

FIG. 1 shows schematically a laser machining system 1. The laser machining system 1 includes a laser ablation apparatus 10 with a laser 12 which generates a laser beam 14 and directs it to a laser head 16 with a redirecting arrangement 18. The re-directing arrangement 18 can change the orientation of the laser beam 14 onto a surface 20 of a workpiece 22 also referred as substrate. The re-directing arrangement 18 includes a focusing optical system 24. The substrate or workpiece 22 is disposed in an accommodation device 26, placed in a working chamber 28 defining an enclosure.

The laser machining system 1 also includes a control unit 30 which controls a positioning arrangement 32 by which a relative position between the laser head 16 and the workpiece 22 can be adjusted and changed. The number of linear axis and rotational axis of the positioning arrangement 32 may vary. For the linear displacement of the workpiece 22 as well as the laser head 16 the positioning arrangement 32 may include additional adjustment devices. The relative position to be adjusted between the laser head 16 and the workpiece 22 is controlled by the control unit 30. The control unit 30 controls the laser head 16 for adjusting or changing the machining parameters before and during the machining of the workpiece 22.

The laser machining system 1 includes a gas supply 40 comprising a gas supply structure 41 as well as a gas removal or extraction structure 42 which is arranged in a such a way that a gas flow, indicated by arrow 44, is generated. During machining of the workpiece 22 the gas flow 44 in the area of the surface 20 of the workpiece 22 to be machined can be adjusted so as to remove ablation debris generated during the laser ablation by sublimation of material from machining location. Furthermore, the laser machining system 1 comprises a temperature system 11, which is explained in detail below.

In the laser ablation apparatus 10, the work chamber 28 is defined by a housing 60 to form an interior space and may include an openable door 62 (not shown in FIG. 1) that may give excess to the interior space. The housing 60 can comprise a double wall 64, providing a gap 66 between them, wherein the gap 66 can be filled with air or any suitable isolation material for thermal isolation of the working chamber 28.

For establishing the gas flow 44, at least one inlet 46 and at least one outlet 48 are provided such that gas from the environment of the working chamber 28 can be pressed in or sucked in the enclosed working chamber 28. In an embodiment the working chamber 28 is designed as a vacuum chamber wherein a suctioning off-line 50 is connected to a vacuum pump 52 so that controlled vacuum can be generated in the working chamber 28. Preferably, the redirection arrangement 18 is arranged within the working chamber 28 configured as a vacuum chamber or alternatively it may be arranged outside the vacuum chamber.

Figure 2:
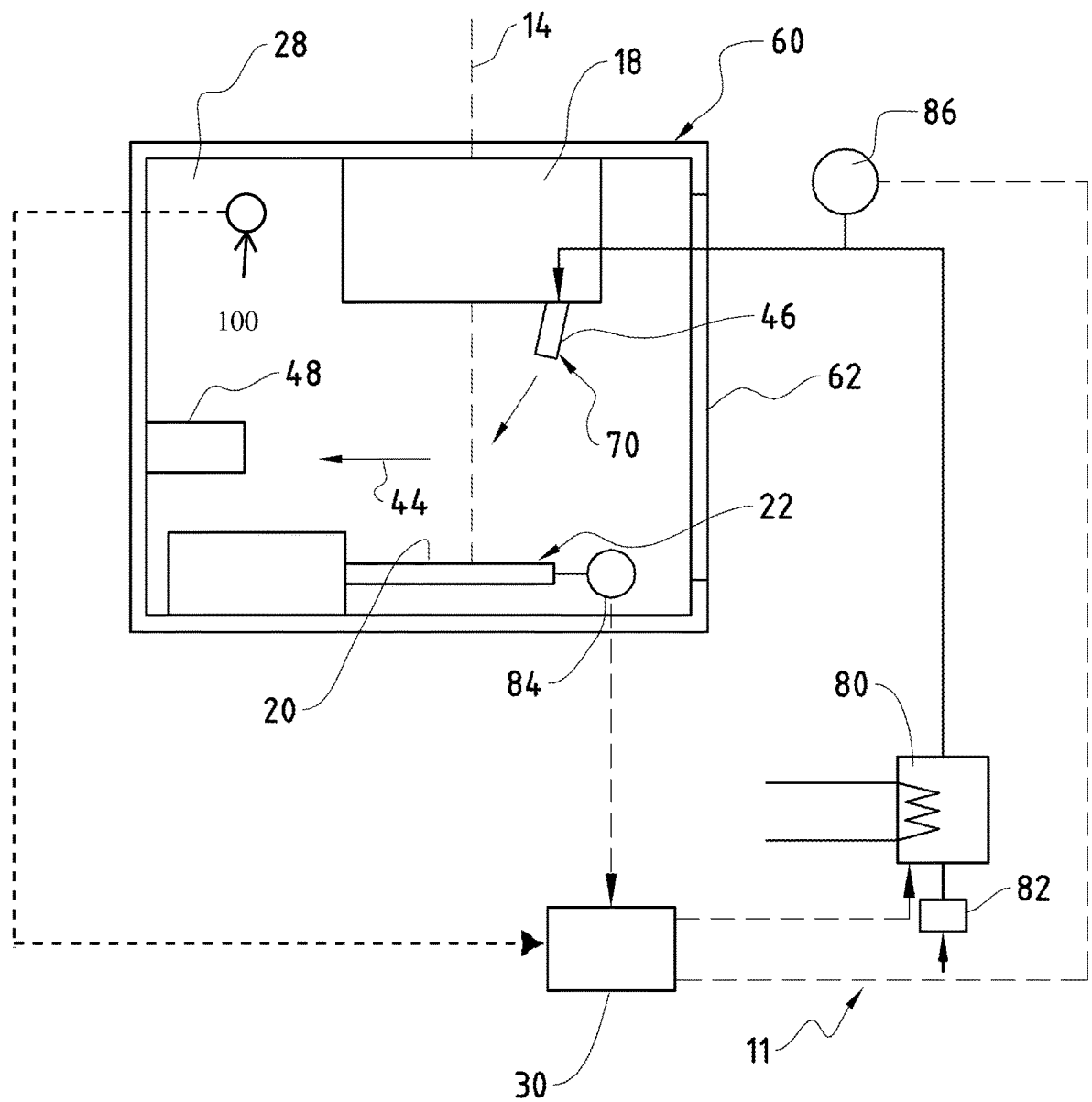
FIG. 2 is a schematic view of the thermal concept comprised in the laser machining system in accordance with the embodiment of the invention.

According to FIG. 2 the temperature system 11 of the laser machining system 1 is shown. Preferably, compressed gas is injected inside the interior space defined by the housing 60 of the working chamber 28 via the at least one inlet 46 configured as at least one nozzle 70. The at least one nozzle 70 can be arranged around the re-directing arrangement 18 in order to protect it from ablation debris. The gas is generally compressed fresh air extracted from the surrounding of the laser machining system 10, but it may also be oxygen or a neutral gas or any suitable gas promoting the ablation process. The at least one nozzle 70 may be properly selected in diameter and positioning to obtain a laminar flow of the gas flow 44. The gas flow cools the elements comprised in the working chamber 28 and in a preferred case it protects the re-direction arrangement 18 against pollutions resulting from the ablation debris. The at least one nozzle 70 is arranged carefully therefore the aerodynamic behavior of the gas flow 44 is set to be laminar. Factors to influence the gas flow 44 are the impinging angle between an axis of the laser beam 14 and the gas flow 44, the gap between the at least one nozzle 70 and the workpiece 22 and the distance between an impingement point of the gas flow 44 and the laser spot of the laser beam 14 on the surface 20 of the workpiece 22. All these and further factors may be adjusted in such a way that a laminar gas flow 44 is achieved at least along the surface 20 of the workpiece 22 to be machined.

According to a preferred embodiment of the invention the temperature of the gas flow 44 is adapted by means of a heating or cooling device configured as a heat exchanger 80. The adapted water circuit of the heat exchanger 80 may be used also for cooling other parts of the laser machining system 1. Or an air or water circuit of additional heat exchangers of the laser machining system 1 used for cooling other parts may be used. The heat exchanger 80 is provided to bring the gas flow 44 to an appropriate temperature before entering the working chamber 28 through the inlet 46. The heat exchanger 80 comprises a primary side connected to a fluid line of heating fluid and a secondary side, configured to bring the incoming gas flow 44 to a predetermined temperature. The pressed in or sucked in gas before entering the heat exchanger 80 passes filter means 82 for ensuring that no particles enter the working chamber 28.

According to a preferred embodiment of the laser machining system 1 the control unit 30 or another control unit is adapted to manage the gas flow 44, e.g. the temperature and the flow parameters. According to one embodiment of the invention different temperature sensors 84, 86 are arranged. One of the temperature sensors 84, for example an infrared sensor, may be adjusted in such a way that the temperature of the workpiece 22 can be determined. Another temperature sensor 86 can be adjusted to measure the temperature of the incoming gas flow 44, pressed in or sucked in the enclosed working chamber 28. Furthermore, other temperature sensor means can be used to measure the temperature of the primary water circuit of the heat exchanger 80, the temperature of the machine structure and/or the workpiece 22. The measured temperature values can be used to control the heat exchanger 80. For this, the determined temperature values are passed to the control unit 30 or another control unit, which is configured for example to operate a valve of the heat exchanger 80 for adjusting the temperature of a primary side of the heat exchanger 80 to control the temperature of a secondary side of the heat exchanger 80, i.e. the temperature of the incoming gas flow 44.

Figure 3:
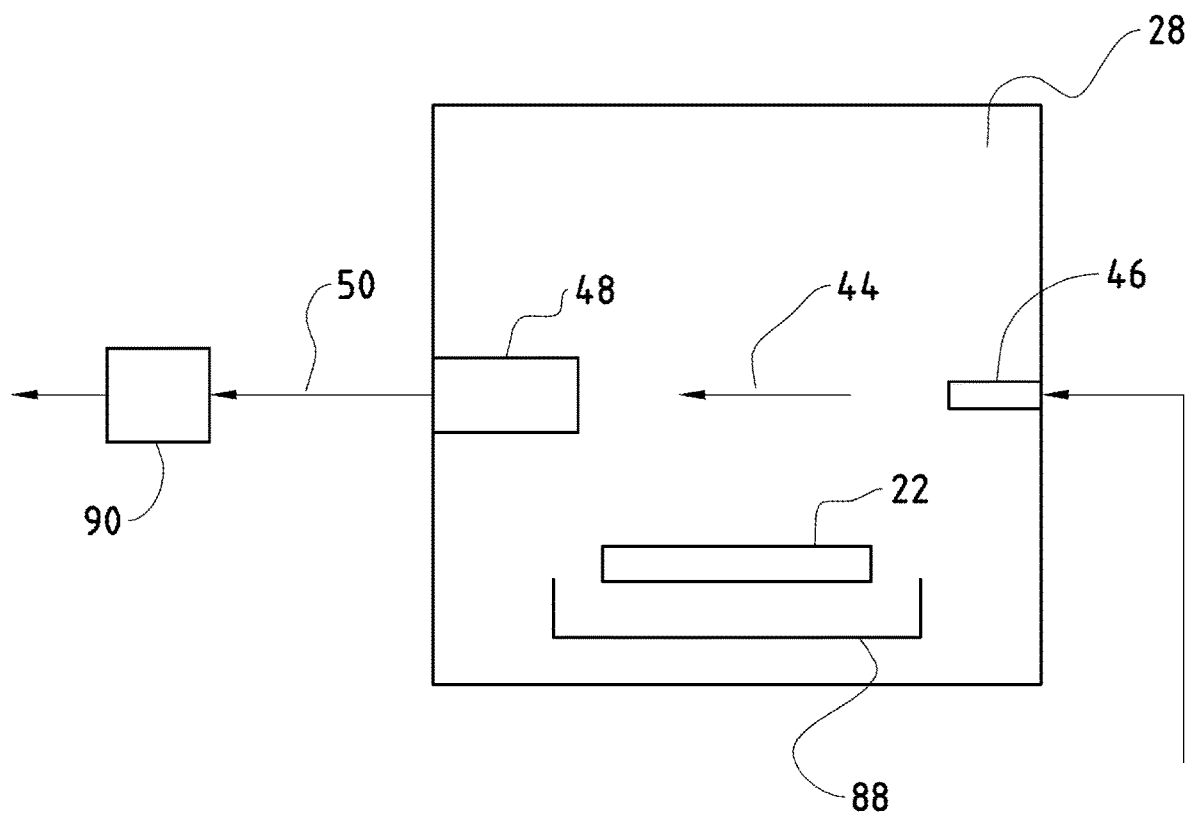
FIG. 3 is a schematic view of a gas flow introduced into a working chamber of the laser machining system according to the embodiment shown in FIG. 1.

As can be seen in detail from FIG. 3 the incoming gas flow 44 is filtered and is heated/cooled to a predetermined temperature and is directed into the closed working chamber 28 via means of the inlet 46 in such a way that preferably a laminar flow is obtained. The gas can be conducted out or sucked out of the working chamber 28 via the suctioning-off line 50 wherein entrapped particles of the ablation debris in the gas flow 44 can be discharged. The bigger particles comprised in ablation debris can be collected in a tray 88 arranged underneath the workpiece 22. The entrapped ablation debris in the gas flow can be absorbed by passing filter means 90 on the path out of the working chamber 28. The path out of the working chamber 28 can be arranged such that a user of the laser machining system 1 standing in front of the laser ablation apparatus 10 is not disturbed.

The invention claimed is:

1. Laser machining system with a controller, a laser ablation apparatus, a gas supply, a temperature system and a working chamber,
the laser ablation apparatus comprising a laser for generating a laser beam directed into the working chamber and onto a surface of a workpiece to be machined, wherein the workpiece is disposed in an accommodation device placed in the working chamber, and wherein the working chamber comprises at least one inlet and at least one outlet for a gas,
the gas supply providing a gas flow to the working chamber,
the temperature system adjusting the temperature of the gas flow and including a first temperature sensor for directly measuring a temperature of gas present in the working chamber and a second temperature sensor for measuring a temperature of the gas flow, and
the controller monitoring the first temperature sensor and the second temperature sensor, and being adapted to control the temperature system and the gas supply based on the first temperature sensor and the second temperature sensor.

2. Laser machining system according to claim 1, wherein the gas is air from the surrounding environment.

3. Laser machining system according to claim 1, wherein the gas supply comprises a gas supply structure and a gas removal structure such that an incoming gas flow is pressed in or sucked in the working chamber by means of a pump and at least one outlet.

4. Laser machining system according to claim 1, wherein the temperature system comprises at least one device to adjust the temperature of an incoming gas flow.

5. Laser machining system according to claim 4, wherein the at least one device is configured as a heat exchanger.

6. Laser machining system according to claim 1, wherein the temperature system comprises at least one temperature sensor configured to determine the temperature of the workpiece.

7. Laser machining system according to claim 6, wherein the temperature determined by the at least one temperature sensor is used by the controller to control a heat exchanger such to adjust the temperature of an incoming gas flow to a predetermined value.

8. Laser machining system according to claim 1, wherein an incoming gas flow is passed through a filtering means before entering the working chamber.

9. Laser machining system according to claim 1, wherein a tray is arranged such that a portion of the ablation debris is collected.

10. Laser machining system according to claim 1, wherein a filtering means is arranged at a gas removal structure adapted to absorb ablation debris.

11. Laser machining system according to claim 1, wherein the working chamber is limited by a double wall.

12. Laser machining system according to claim 11, wherein the double wall of the working chamber provides a gap, which is filled with an insulation material.

13. The laser machining system according to claim 1, further comprising at least one nozzle connected to the gas supply to provide the flow of the gas in the working chamber, wherein the at least one nozzle is configured to generate a laminar flow of gas through the working chamber.

14. The laser machining system according to claim 1, wherein a laser head of the laser ablation apparatus comprises a re-directing arrangement disposed in the working chamber for directing the laser beam of the laser and wherein at least one nozzle is configured to direct ablation debris away from the re-directing arrangement.

15. The laser machining system according to claim 1, wherein the temperature system comprises a heating or cooling device that includes a heat exchanger utilizing water.

16. The laser machining system according to claim 15, wherein the temperature system is configured for cooling electrical devices, and optical and mechanical components of the laser ablation apparatus.

17. The laser machining system according to claim 1, wherein the gas supply provides the flow of the gas both to the working chamber and to the laser ablation apparatus.

18. The laser machining system according to claim 1, wherein the controller is further adapted to control the temperature system and the gas supply based on a temperature of the workpiece.

* * * * *